United States Patent [19]

Benjamin et al.

[11] 3,853,422

[45] Dec. 10, 1974

[54] ADJUSTABLE BORING BAR

[75] Inventors: Milton L. Benjamin; Wilbur N. Miles, both of Chagrin Falls, Ohio

[73] Assignee: Erickson Tool Company, Solon, Ohio

[22] Filed: Nov. 2, 1973

[21] Appl. No.: 412,204

[52] U.S. Cl. .................. 408/161, 408/168, 408/179
[51] Int. Cl. ......................................... B23b 29/034
[58] Field of Search ........... 408/161, 153, 154, 155, 408/157, 158, 168, 169, 179, 185, 197, 198, 714

[56] References Cited
UNITED STATES PATENTS

| | | | |
|---|---|---|---|
| 1,097,096 | 5/1914 | Heverman et al. | 408/197 X |
| 3,728,037 | 4/1973 | Benjamin et al. | 408/168 |
| 3,738,767 | 6/1973 | Benjamin et al. | 408/161 |

*Primary Examiner*—Andrew R. Juhasz
*Assistant Examiner*—Z. R. Bilinsky
*Attorney, Agent, or Firm*—Donnelly, Maky, Renner & Otto

[57] ABSTRACT

An adjustable boring bar characterized in that the bar has a transverse rectangular slot diametrically therethrough in which the overlapped rectangular shank portions of a pair of cutter elements are slidable for simultaneous radial outward or inward movement with respect to the longitudinal axis of the bar by a screw actuated cam means which engages the respective shank portions. The screw actuated cam means comprises a nut movable in a transverse bore in the bar by rotation of a dial screw, said nut having an inclined cam face which engages the tapered rear end of a cam plunger to move it longitudinally in a central bore in the bar, said plunger having a V-shaped front end engaged with offset V-shaped notches in the respective shank portions of the cutter elements. The adjustable boring bar herein is further characterized in that the cutter elements are locked in adjusted position by screw means in the bar extending transversely through openings in the overlapped shank portions of the cutter elements and being operative to constrict the transverse slot to firmly clamp the overlapped shank portions together.

3 Claims, 5 Drawing Figures

PATENTED DEC 10 1974 3,853,422

ADJUSTABLE BORING BAR

BACKGROUND OF THE INVENTION

In one known form of adjustable boring bar as disclosed in the Benjamin et al U.S. Pat. No. 3,738,767, granted June 12, 1973, the cutter elements are of T-shaped configuration with the bar being formed with guide and support shoulders to support the cross bar portions of the cutter elements against cutting pressure and rotation and formed with a transverse bore to slidably receive the overlapped semi-cylindrical shank portions of the cutter elements, the shank portions forming pockets with oppositely inclined surfaces with which a relatively narrow V-shaped tongue of a cam actuated plunger is engaged to cause radial movement of the cutter elements upon axial movement of the plunger in a longitudinal central bore of the boring bar.

In precision boring operations, it has been found desirable to firmly lock the cutter elements in accurately adjusted positions but this is not possible in the construction of said U.S. Pat. No. 3,738,767 because the transverse bore in the bar in which the semi-cylindrical overlapped shank portions of the cutter elements are slidable cannot be constricted to effect such firm clamping.

SUMMARY OF THE INVENTION

Contrary to the foregoing, the present adjustable boring bar embodies a pair of diametrically opposite cutter elements which have overlapped rectangular shank portions which are slidable in a transverse slot diametrically through the boring bar, the slot being closed by a cap member secured by screws to the boring bar in such manner that a clamping screw in the boring bar extending transversely through openings in the shank portions of the cutter elements is eccentrically disposed with respect to the cap mounting screws so that the boring bar may be flexed at the slot to firmly clamp the shank portions together in overlapped relation in accurately adjusted position to maintain precision adjustment of the cutter elements without opportunity for movement of the cutter elements while performing precision boring operations on a workpiece.

DETAILED DISCUSSION OF A PREFERRED EMBODIMENT

Figure 1:
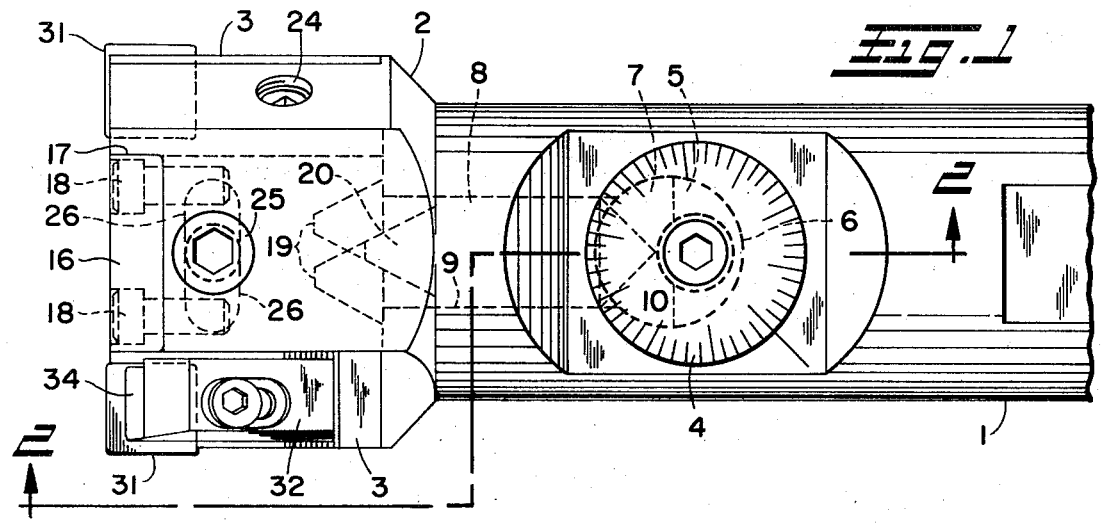
FIG. 1 is a top plan view of an adjustable boring bar embodying the present invention.

The boring bar 1 herein has a head portion 2 in which a pair of cutter elements 3 are radially adjustable simultaneously by turning a dial screw 4 which is rotatable with respect to a nut 5 movable in the transverse bore 6 in said bar adjacent the head portion 2 thereof. The threads in the nut 5 are eccentrically disposed with respect to the axis of the transverse bore 6 so that the nut 5 may be of cylindrical form but yet be nonrotatable in the bore 6, whereby its inclined cam face 7 will always be disposed in the position shown so as to move the cam plunger 8 in the longitudinal bore 9 in the head portion 2, said plunger 8 having a conical rear end 10 engaged with the cam face 7. The dial screw 4 is firmly seated against the bar 1 by means of a Belleville spring 11 which is engaged by a washer 12 nonrotatable on the dial screw 4, the latter being retained by screw 13.

The cutter elements 3 are of generally rectangular cross-section having overlapping shank portions 14 of rectangular cross-section which are slidable in a rectangular slot 15 diametrically through the head portion 2, the transverse slot 15 being closed by a cap member 16 which is bottomed in a groove 17 transverse to slot 15 and which is secured to the head portion 2 by diagonally disposed screws 18.

Figure 2:
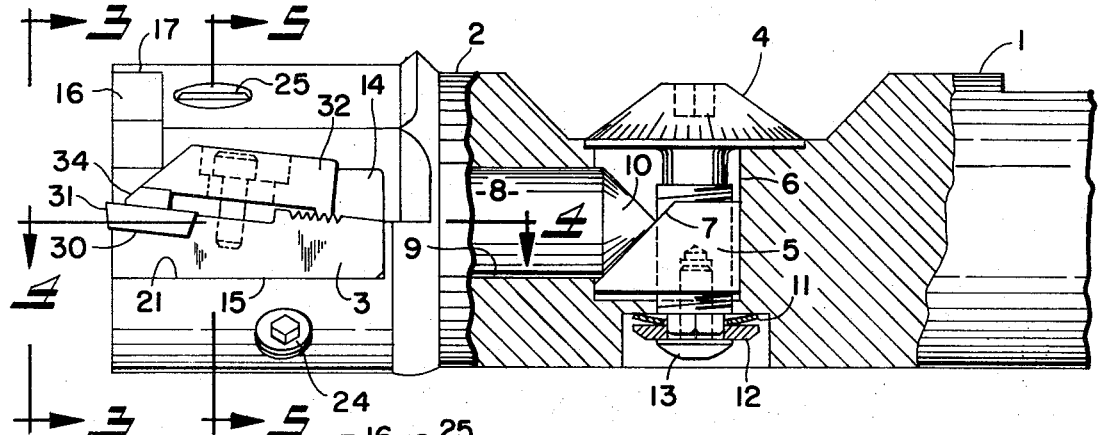
FIG. 2 is a side elevation view, partly in cross-section, as viewed along the line 2—2, FIG. 1.
Figure 3:
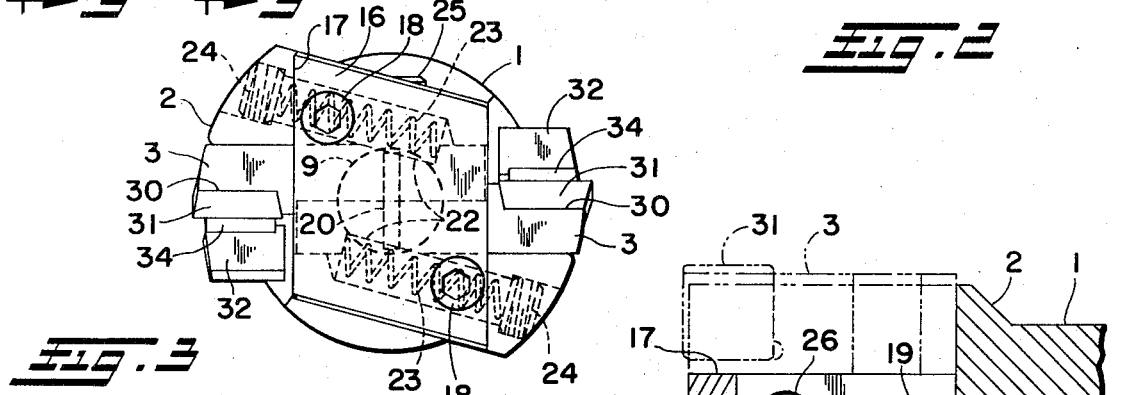
FIG. 3 is an end elevation view as viewed from the left hand end of FIG. 2.
Figures 4, 5:
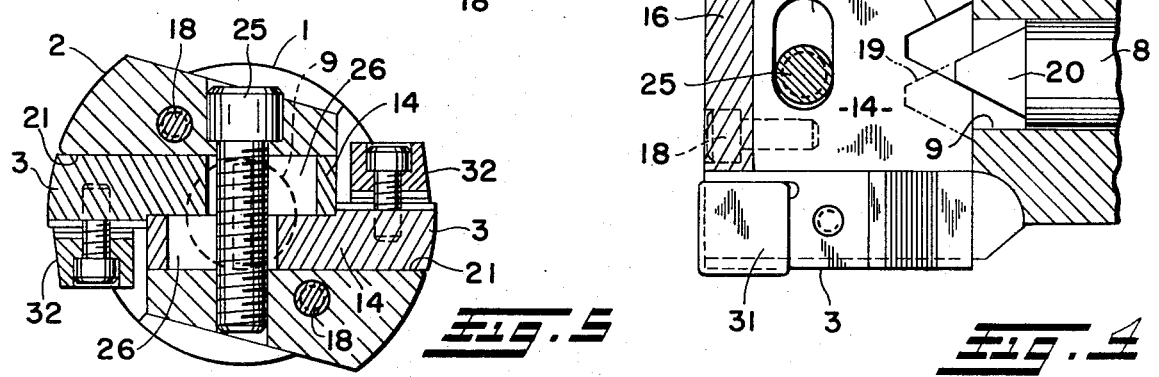
FIG. 4 is a cross-section view taken substantially along the line 4—4, FIG. 2.
FIG. 5 is a cross-section view taken substantially along the line 5—5, FIG. 2.

The sides of the shank portions 14 which are adjacent the bottom wall of the slot 15 are formed with offset V-shaped notches 19 which provide respective inclined faces which are engaged with the respective sides of the V-shaped front end 20 of the plunger 8. When the dial screw 4 is turned in a direction to move the nut 5 upwardly as viewed in FIG. 2 the cam plunger 8 will be moved to the left in the longitudinal bore 9 whereby the V-shaped front end 20 will wedge the cutter elements 3 radially outwardly. The head portion 2 provides guide and support surfaces 21 to support the cutter elements 3 against cutting pressure and turning in all radially adjusted positions thereof and furthermore the shank portions 14 are formed with pockets 22 in which are disposed springs 23 backed up by set screws 24, said springs 23 being constantly operative to maintain the opposite inclined faces of the notches 19 in engagement with the opposite faces of the V-shaped front end 20 of the cam plunger 8 and thus, if the dial screw 4 is turned in a direction to move the nut 5 downwardly, the springs 23 will urge the cutter elements radially inwardly to maintain engagement of the notches 20 with the plunger 8 and to maintain engagement of the conical rear end 10 of the plunger 8 with the cam surface 7 of the nut 5.

The shank portions 14 of the cutter elements 3 are a close sliding fit between the side walls and end walls of the transverse slot 15 and to firmly lock the cutter elements 3 in precise adjusted position, the head portion 2 has a clamping screw 25 extending through elongated openings 26 in the respective shank portions 14. By reason of the disposition of the clamping screw 25 with respect to the cap mounting screws 18 which secure the cap member 16 in place, the tightening of the clamping screw 25 effects flexing of the side walls of the slot 15 into firm clamping engagement with the overlapped shank portions 14 of the cutter elements 3.

Each cutter element 3 at its radially outer and front end portion is formed with a recess 30 in which is disposed an indexable insert 31 of cemented carbide or the like which is held in place by means of the screw actuated clamp 32 and, if desired, a chip breaker insert 34 may be embodied in the clamp 32. The clamp 32 is adjusted with respect to the cutting edge of the insert 31 as by means of serrations thereof meshing in serrations of the outer portion of the cutter element 3. By way of example, the indexable insert 31 is of square form to provide four cutting edges so that when one cutting edge wears the clamp 32 may be loosened and the insert 31 indexed to provide a new cutting edge. As apparent, the insert may be of other form well known in the art such as triangular, diamond-shaped, pentagon, hexagon, octagon, etc. Moreover, such inserts 31 are available with positive backrake, neutral backrake (0°) or negative backrake; also inserts 31 having different front clearance angles are available and form no part of the present invention. Moreover, the inserts 31 may be brazed in place or may be held by cam means, by screws therethrough, or by other expedients known in the art.

The dial screw 4 and nut 5 threads are preferably of 40 pitch whereby, when the nut bevel is 45°, the plunger 8 will be moved 0.025 inch per revolution of the dial screw 4. When the angle of the inclined faces of the V-shaped front end is 26°-34' with respect to the longitudinal axis of the boring bar each cutter element 3 will be moved radially 0.0125 inch per revolution of the dial screw 4 and, hence, if the dial screw 4 has fifty divisions therearound each division will represent a 0.0005 inch change in diameter across the cutting edges of the insert 31. The nut 5, the cam plunger 8, and the shank portions 14 of the cutter elements 3 are all preferably close sliding fits in the respective bores 6 and 9 and in the rectangular slot 15 so that accurate adjustment is maintained, and the cutter elements 3 after adjustment are firmly locked together by tightening the clamping screw 25 without causing a change in the accurate setting thereof. If greater accuracy in setting of the dial screw 4 is desired, the bar 1 may have a vernier scale thereon.

As aforesaid, the dial screw 4 is frictionally seated in the boring bar and the springs 23 acting on the cutter elements 3 take up any play in the nut 5 and dial screw 4 threads so that the cutter elements 3 may be adjusted radially outward or inward without affecting the accuracy of adjustment.

Generally, the distance across the cutting edges of the inserts 31 will be set by using a micrometer, a test hole will be bored and measured, and then the dial screw 4 may be turned a predetermined angle by dial divisions to obtain the final accurate adjustment.

The embodiments of the invention in which an exclusive property or privilege is claimed are defined as follows:

1. An adjustable boring bar comprising a bar having a longitudinal bore intersected by a transverse slot of rectangular cross-section and by a transverse bore; a pair of cutter elements having rectangular shank portions slidable in said slot and having cutting edges at their radially outer extremities; screw actuated cam means in said transverse bore; a cam plunger movable lengthwise in said longitudinal bore and having engagement with said cam means and with said cutter elements to move the latter in said transverse slot responsive to actuation of said cam means; clamp screw means in said bar operative to flex the slotted portion of said bar to firmly clamp said shank portions together in predetermined adjusted relation; said transverse slot comprising a groove in the end portion of said bar which defines the opposite side walls and one end wall of said slot; a cap member secured on the end of said bar to close said groove to form the other end wall of said slot; and screw means eccentrically disposed with respect to said clamp screw means for securing said cap member to said bar whereby tightening of said clamp screw means flexes the opposite side walls of said slot toward each other into clamping relation with the overlapped shank portions of said cutter elements therebetween.

2. The adjustable boring bar of claim 1 wherein said screw means for securing said cap member to said bar are at two diagonally opposite corners of said cap member while the other two diagonally opposite corners are unrestrained for flexing by said clamp screw means which extends in eccentric relation to said diagonally opposite screw means.

3. The adjustable boring bar of claim 1 wherein said cap member is bottomed in a groove diametrically across the end of said boring bar, said groove being perpendicular to said slot and having its bottom substantially flush with the adjacent sides of said overlapping shank portions.

* * * * *